(12) United States Patent
Lin et al.

(10) Patent No.: US 9,667,456 B2
(45) Date of Patent: May 30, 2017

(54) COMPRESSIVE SENSING SYSTEM BASED ON PERSONALIZED BASIS AND METHOD THEREOF

(71) Applicant: NATIONAL TAIWAN UNIVERSITY, Taipei (TW)

(72) Inventors: Yu-Min Lin, Taipei (TW); Yi Chen, Taipei (TW); Hung-Chi Kuo, Taipei (TW); An-Yeu Wu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 15/222,966

(22) Filed: Jul. 29, 2016

(65) Prior Publication Data

US 2017/0041166 A1 Feb. 9, 2017

Related U.S. Application Data

(60) Provisional application No. 62/282,607, filed on Aug. 5, 2015.

(51) Int. Cl.
*H04B 1/00* (2006.01)
*H04L 25/03* (2006.01)
*H04B 7/0456* (2017.01)
*H04L 12/26* (2006.01)

(52) U.S. Cl.
CPC ..... *H04L 25/03299* (2013.01); *H04B 7/0456* (2013.01); *H04L 43/16* (2013.01)

(58) Field of Classification Search
CPC .................................................. H04B 7/0456
See application file for complete search history.

(56) References Cited

U.S. PATENT DOCUMENTS

| 2006/0239336 | A1* | 10/2006 | Baraniuk | H04L 25/20 375/216 |
| 2010/0265799 | A1* | 10/2010 | Cevher | G01S 3/8006 367/121 |
| 2014/0081087 | A1* | 3/2014 | Yu | A61B 5/6898 600/301 |
| 2014/0287723 | A1* | 9/2014 | LaFever | H04W 12/02 455/411 |

* cited by examiner

*Primary Examiner* — Hsin-Chun Liao
(74) *Attorney, Agent, or Firm* — Chih Feng Yeh; Huntington IP Consulting Co., Ltd.

(57) ABSTRACT

Disclosed are a compressive sensing system based on a personalized basis and a method thereof; first a sensing end senses an original signal and transmits the original signal to a reconstruction end; the reconstruction end generates a personalized basis by means of a dictionary learning method; next, the sensing end is made to sample the original signal according to a sampling matrix to generate a compressed signal and transmit the compressed signal to the reconstruction end, so that the reconstruction end executes a compressive sensing reconstruction algorithm according to the personalized basis and the compressed signal to recover the compressed signal into the original signal, thereby achieving an effect of improving signal recovering quality and a compression ratio.

10 Claims, 8 Drawing Sheets

COMPRESSIVE SENSING SYSTEM BASED ON PERSONALIZED BASIS AND METHOD THEREOF

CROSS-REFERENCE TO RELATED APPLICATION

This application claims the benefit of U.S. Provisional Application No. 62/282,607, filed Jul. 29, 20015.

BACKGROUND OF RELATED ARTS

1. Technical Field

The present invention relates to a sensing system and a method thereof, in particular, to a compressive sensing system based on a personalized basis that first performs training to generate a personalized basis by using an original signal to maintain sparsity of a signal, so as to ensure that the original signal can be completely recovered and a method thereof.

2. Description of Related Art

In recent years, in the trend of an aging society and the increase of chronic diseases, there is a huge increase in requirements for home health care. How to consolidate a portable sensor and wireless communications to implement a wireless care system is exactly an important direction for implementing home health care. However, the wireless care system needs to detect various physiological signals continuously to provide real-time monitoring of a condition of a patient, and a large number of signals consume a large quantity of frequency bandwidths and power of the system, and therefore data needs to be compressed before transmission so as to improve a frequency bandwidth utilization rate. Generally, to compress data, compressive hardware is generally built in a conventional physiological signal sensor. However, the compressive hardware is too complex; consequently, the sensor consumes more power, and costs also become higher.

In view of this, a compressive sensing technology is put forward by a manufacturer to resolve the problem. The compressive sensing is to obtain a low-dimensional measurement value for a high-dimensional sparse signal by means of a sampling matrix. Therefore, the system only needs to use a low-dimensional signal as a transfer, and when necessary, reconstruct the low-dimensional sample into a high-dimensional signal by means of methods such as norm minimization. The compressive sensing has two features: (1) being capable of sampling at a frequency less than that of Nyquist Theorem, thereby reducing costs and power consumption of a digital analogue converter in a sensor; and (2) achieving a compressive effect during sampling without extra compressive hardware, thereby saving costs and power consumption of compressive hardware in a conventional sensor. However, a basis of the compressive sensing is built on sparsity of a signal, and the signal needs to be sparse enough to be recovered. Unfortunately, a conventional pre-constructed basis cannot make a physiological signal become sparse enough; when the signal is not sparse enough, a problem that the signal cannot be recovered into an original signal occurs.

Based on above, it can be known that a problem that when a signal is not sparse enough, the compressive sensing cannot recover the signal into an original signal has existed for a long time in the prior art. Therefore, it is really necessary to put forward a technical means for improvement to resolve the problem.

SUMMARY

The present invention discloses a compressive sensing system based on a personalized basis and a method thereof.

First, the present invention discloses a compressive sensing system based on a personalized basis, including: a sensing end and a reconstruction end. The sensing end includes: a sensing module, a sampling module, and a transmission module. The sensing module is configured to continuously sense an original signal by means of a sensor; the sampling module is configured to sample the sensed original signal according to a preset sampling matrix to generate a compressed signal; and the transmission module is configured to transmit the sensed original signal, and after receiving a control signal, enable the sampling module to transmit the generated compressed signal. For parts at the reconstruction end, the reconstruction end includes: a dictionary learning module and a reconstruction module. The dictionary learning module is configured to receive the original signal from the sensing end, and perform training by means of a dictionary learning method according to the original signal; during a training process, continuously detect a sparsity to generate a personalized basis when the sparsity falls into a preset range, and after the personalized basis is generated, transmit the control signal to the sensing end; the reconstruction module is configured to execute, after the personalized basis is generated, a compressive sensing reconstruction algorithm according to the personalized basis and the compressed signal received from the sensing end to recover the compressed signal into the original signal.

In addition, the present invention discloses a compressive sensing method based on a personalized basis, which is applied in an environment having a sensing end and a reconstruction end, the method including: continuously sensing, by the sensing end, an original signal by means of a sensor; transmitting, by the sensing end, the sensed original signal to the reconstruction end; performing, by the reconstruction end, training by means of a dictionary learning method according to the original signal, during a training process, continuously detecting a sparsity to generate a personalized basis when the sparsity falls into a preset range, and after the personalized basis is generated, transmitting a control signal to the sensing end; after receiving the control signal, sampling, by the sensing end, the original signal according to a preset sampling matrix to generate a compressed signal, and transmitting the compressed signal to the reconstruction end; and executing, by the reconstruction end, a compressive sensing reconstruction algorithm according to the personalized basis and the compressed signal received from the sensing end to recover the compressed signal into the original signal.

The system and method disclosed in the present invention are stated as above, and differ from the prior art in that in the present invention, first, a sensing end senses an original signal and transmits the sensed original signal to a reconstruction end; the reconstruction end generates a personalized basis by means of a dictionary learning method; then the sensing end is made to sample the original signal according to a sampling matrix to generate a compressed signal and transmit the compressed signal to the reconstruction end, so that the reconstruction end executes a compressive sensing reconstruction algorithm according to the personalized basis and the compressed signal, and recovers the compressed signal into the original signal.

By using the foregoing technical means, the present invention can achieve a technical effect of improving signal recovering quality and a signal compression ratio.

DETAILED DESCRIPTION

The following describes implementation manners of the present invention in detail with reference to the accompanying drawings and embodiments, thereby fully understanding an implementation process, of the present invention, of how to apply technical means to resolve a technical problem and achieve technical effects, and implementing the process on such basis.

Before a compressive sensing system based on a personalized basis and a method thereof disclosed in the present invention are described, brief description is made to the present invention first; the present invention is to design a dedicated sparsifying basis Ψ for each person by means of training to improve signal sparsity (the signal sparsity is that the number of values that are not zeros in a signal is small, or in other words, most coefficients are zeros), so as to improve signal recovering quality and a signal compression ratio.

In practical implementation, the process may be divided into two phases: in a first phase, a sensing end is set to be in a standard mode for transmitting sensed uncompressed physiological signals; a reconstruction end receives uncompressed physiological signals of a specific person within a period of time, and then establishes a dedicated basis Ψ for the person by means of a dictionary learning technology to improve recovering quality and a compression ratio. Then, in a second phase, the sensing end is set to be in a compressive sensing mode with low power consumption; in most time, the sensing end operates in the phase, and samples and compresses the physiological signals of the person using compressive sensing by means of low power consumption; the compressed signals are recovered at the reconstruction end, and an effect of recovering the signals can be improved substantially using the personalized basis Ψ. Using electrocardiography (ECG) signals as an example, upon comparison between a conventional manner of using a DWT basis as a basis Ψ of ECG signals to perform reconstruction, and a manner of using a personalized basis to reconstruct ECG signals, in a case of same recovering quality, a compression ratio of the latter is far greater than a compression ratio of the former, and description is made with reference to the accompanying drawings later. In addition, the present invention may further include designs such as "denoising", "symptom detection", and "self correction and refreshing" to maintain stability of a signal compression ratio.

Figure 1:
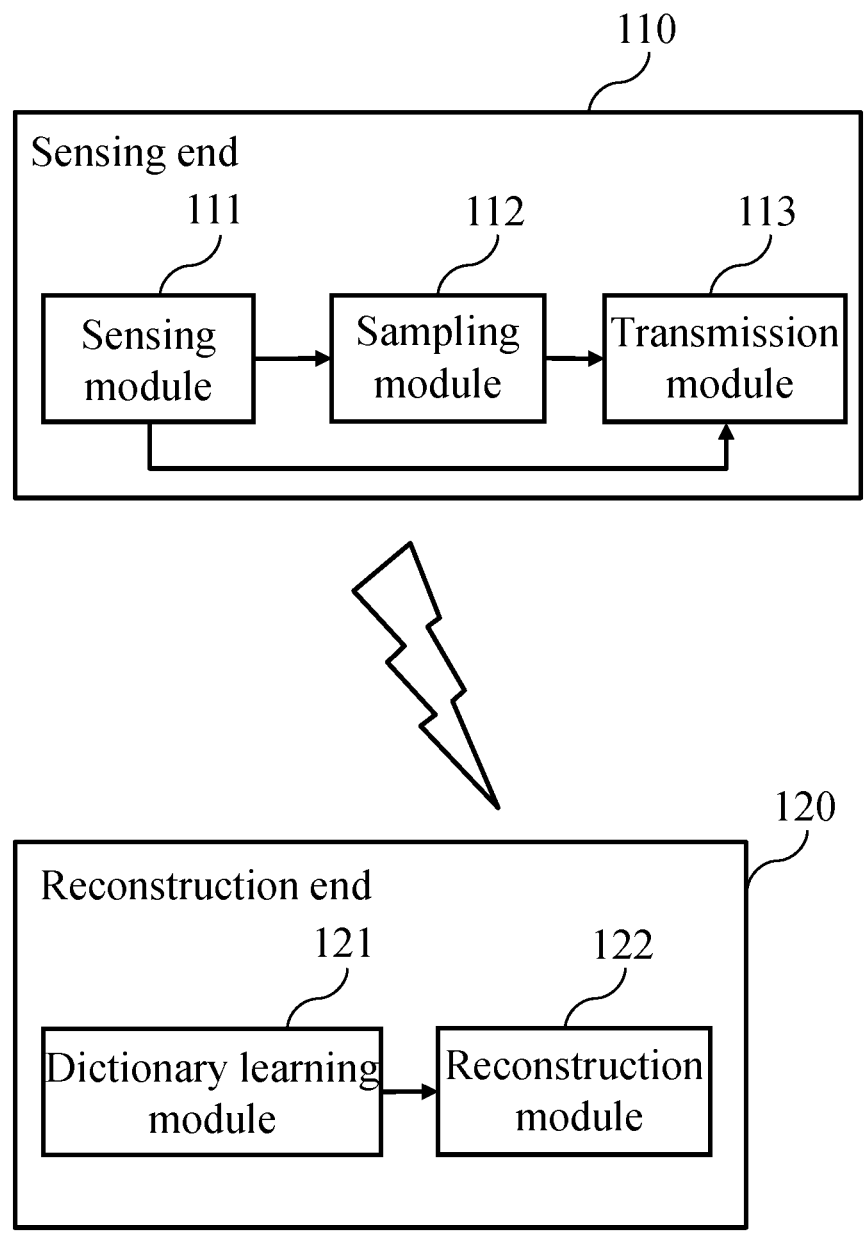
FIG. 1 is a system block diagram of a compressive sensing system based on a personalized basis of the present invention.

The following further describes a compressive sensing system based on a personalized basis and a method thereof of the present invention with reference to the accompanying drawings. First refer to "FIG. 1"; "FIG. 1" is a system block diagram of a compressive sensing system based on a personalized basis of the present invention, where the system includes: a sensing end 110 and a reconstruction end 120. In practical implementation, the sensing end 110 is a wearable apparatus for sensing physiological signals of a user by means of a sensor; the sensing end 110 and the reconstruction end 120 can perform communication by means of a wireless transmission technology; the wireless transmission technology is: for example, infrared, Bluetooth, radio frequency identification, Wi-Fi, and ZigBee.

Specifically, the sensing end 110 includes: a sensing module 111, a sampling module 112, and a transmission module 113. The sensing module 111 is configured to continuously sense an original signal (or called a physiological signal) by means of a sensor; for example, ECG is sensed by means of an ECG sensor, electroencephalogram (EEG) is sensed by means of a brain wave sensor, and electromyography (EMG) is sensed by means of an EMG sensor.

The sampling module 112 is configured to sample the sensed original signal according to a preset sampling matrix to generate a compressed signal. In practical implementation, the sampling module 112 generates the compressed signal after sampling the original signal using the sampling matrix by means of a compressive sensing technology. The sampling matrix is at least one of a random Gaussian matrix, a random Bernoulli matrix, a some orthogonal matrix, a Toeplitz matrix, a circulant matrix, and a random sparse matrix.

The transmission module 113 is configured to transmit the sensed original signal, and after receiving a control signal, enable the sampling module 112 to transmit the generated compressed signal. In practical implementation, the transmission module 113 may transmit the compressed signal to the reconstruction end 120 by means of wireless transmission. However, wired transmission can be also used to transmit the compressed signal to the reconstruction end 120. In addition, the control signal is used to control the sensing end 110 to transmit the original signal or compressed signal; for example, before receiving the control signal, the sensing end 110 continuously transmits the sensed original signal, and after receiving the control signal, the sensing end 110 is switched to transmit the compressed signal.

It should be supplemented that, because the sensing end 110, in the first phase, directly transmits the uncompressed signal sensed by the sensing module 111 for the reconstruction end 120 to perform training, the sampling module 112 may be first disabled in the first phase, and until the second phase, is switched to be enabled according to the control signal. In practical implementation, the sensing module 111 of the sensing end 110 includes conventional signal sensing and sampling for generating an uncompressed original signal. The sampling module 112 of the sensing end 110 generates the compressed signal according to the original signal by means of the compressive sensing; the sensing end 110 may further switch between transmitting the original signal and transmitting the compressed signal by controlling a switch; for example, in the first phase or when the control signal is received, the switch is driven to switch to transmit the uncompressed original signal, and in the second phase, the switch is driven to switch to transmit the compressed signal.

For parts at the reconstruction end 120, the reconstruction end 120 includes: a dictionary learning module 121 and a reconstruction module 122. The dictionary learning module 121 is configured to receive the original signal from the sensing end 110, and perform training by means of a dictionary learning method according to the original signal; during a training process, continuously detect a sparsity to generate a personalized basis when the sparsity falls into a preset range, and after the personalized basis is generated, transmit the control signal to the sensing end 110. In practical implementation, the personalized basis is a sparsifying basis generated after training according to the original signal of a user.

The reconstruction module 122 is configured to execute, after the personalized basis is generated, a compressive sensing reconstruction algorithm according to the personalized basis and the compressed signal received from the sensing end 110 to recover the compressed signal into the original signal. The reconstruction end 120 recovers the compressed signal into the original signal using the compressive sensing reconstruction algorithm, and a recovering effect thereof depends upon a selection of the sparsifying basis; if the sparsifying basis used as a personalized basis is not good after selection, the signal recovering effect is poor. In practical implementation, the compressive sensing reconstruction algorithm may implement approximation of a signal vector by selecting appropriate atoms and by means of gradual increasing, for example, a matching pursuit algorithm, an orthogonal matching pursuit algorithm, and a complementary space pursuit algorithm; or norm 0 is relaxed to norm 1, and then solution is performed by means of linear programming, for example: a gradient projection algorithm, a basis pursuit algorithm, and a least angle regression algorithm.

Figure 2:
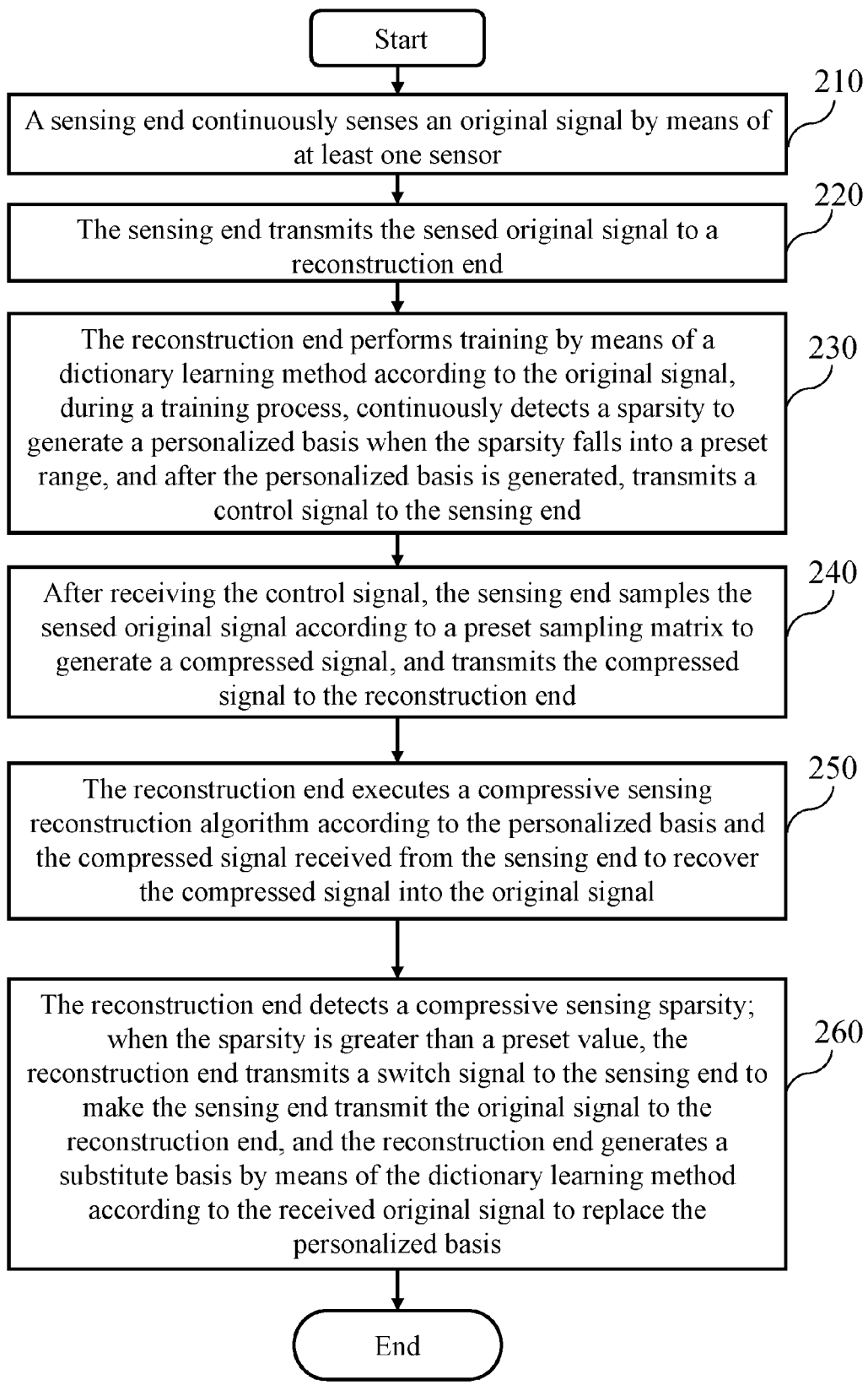
FIG. 2 is a method flowchart of a compressive sensing method based on a personalized basis of the present invention.

Next, refer to "FIG. 2". "FIG. 2" is a method flowchart of a compressive sensing method based on a personalized basis of the present invention, which is applied in an environment having a sensing end 110 and a reconstruction end 120, where steps thereof include: continuously sensing, by the sensing end 110, an original signal by means of a sensor (step 210); transmitting, by the sensing end 110, the sensed original signal to the reconstruction end 120 (step 220); performing, by the reconstruction end 120, training by means of a dictionary learning method according to the original signal, during a training process, continuously detecting a sparsity to generate a personalized basis when the sparsity falls into a preset range, and after the personalized basis is generated, transmitting a control signal to the sensing end 110 (step 230); after receiving the control signal, sampling, by the sensing end 110, the original signal according to a preset sampling matrix to generate a compressed signal, and transmitting the compressed signal to the reconstruction end 120 (step 240); and executing, by the reconstruction end 120, a compressive sensing reconstruction algorithm according to the personalized basis and the compressed signal received from the sensing end 110 to recover the compressed signal into the original signal (step 250). By means of the foregoing steps, a sensing end 110 senses an original signal and transmits the sensed original signal to a reconstruction end 120; the reconstruction end 120 generates a personalized basis by means of a dictionary learning method; then the sensing end 110 is made to sample the original signal according to a sampling matrix to generate a compressed signal and transmit the compressed signal to the reconstruction end 120, so that the reconstruction end 120 executes a compressive sensing reconstruction algorithm according to the personalized basis and the compressed signal, and recovers the compressed signal into the original signal.

After step 250, the reconstruction end 120 may further detect a compressive sensing sparsity; when the sparsity is greater than a preset value, the reconstruction end 120 transmits a switch signal to the sensing end 110 to make the sensing end 110 transmit the original signal to the reconstruction end 120, and the reconstruction end 120 generates a substitute basis by means of the dictionary learning method according to the received original signal to replace the personalized basis (step 260). In other words, when the sparsity is greater than the preset value, it indicates that sparsity is reduced, and a recovering effect is not good, and training needs to be performed again according to the original signal to generate a new personalized basis. Therefore, by transmitting a switch signal to the sensing end 110, the sensing end 110 is made to transmit the original signal for a dictionary learning module 121 to perform training again to generate a new personalized basis.

Figure 3:
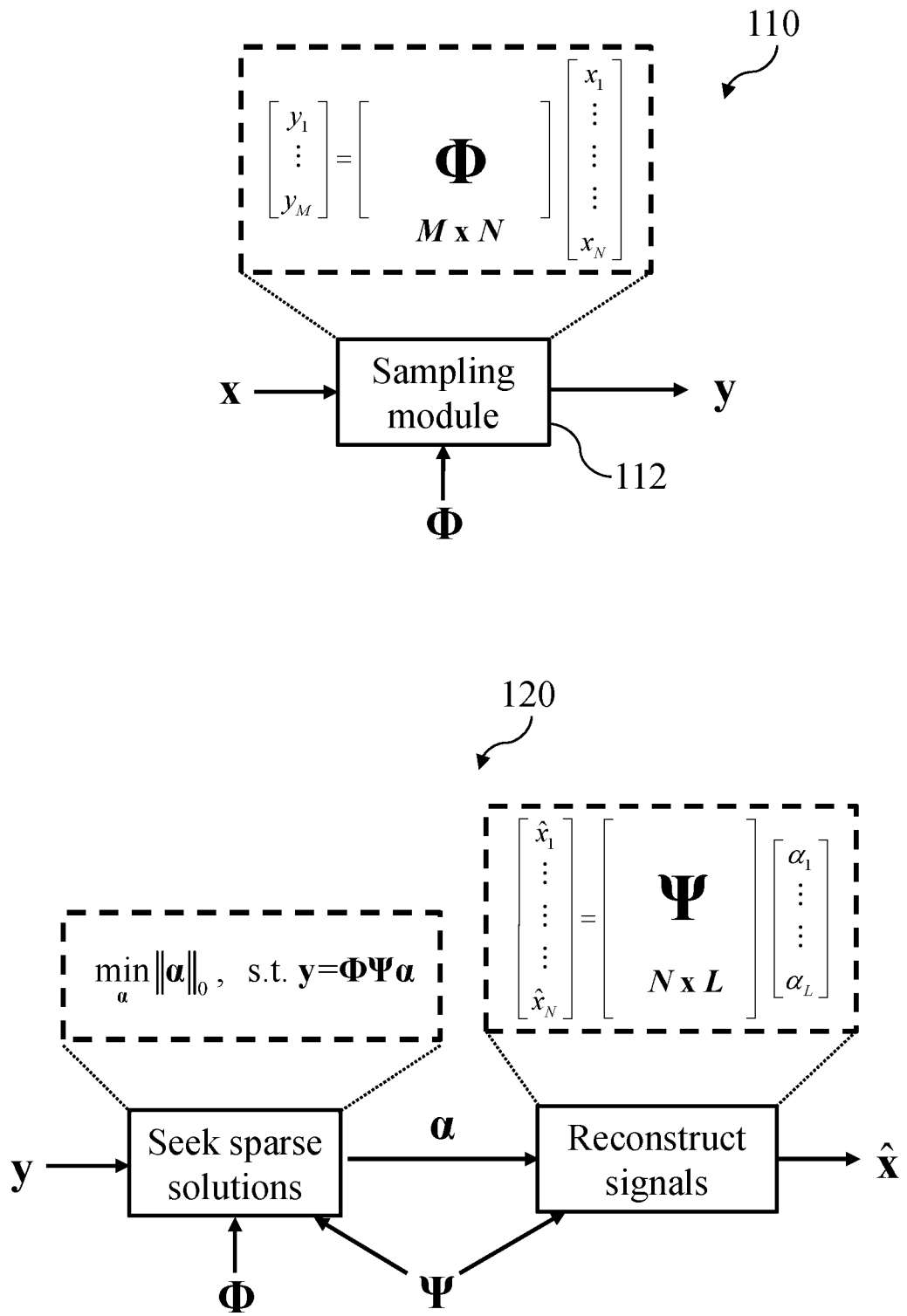
FIG. 3 is a schematic diagram of applying the present invention to perform sampling and signal reconstruction.
Figure 8:
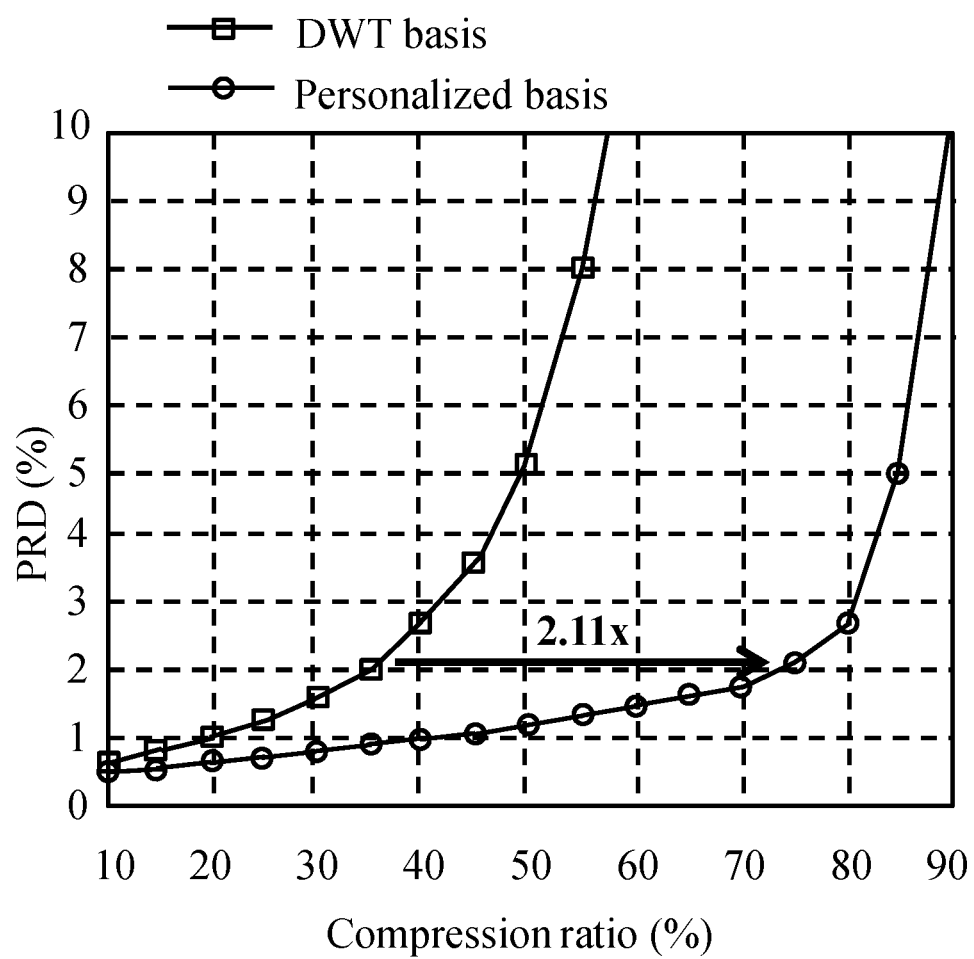
FIG. 8 is a schematic diagram of comparing a compression ratio of applying a personalized basis of the present invention to reconstruct a signal and a compression ratio of applying a conventional discrete wavelet transform (DWT) basis to reconstruct a signal.

The following makes the following description by means of embodiments with reference to "FIG. 3" to "FIG. 8". First refer to "FIG. 3". "FIG. 3" is a schematic diagram of applying the present invention to perform sampling and signal reconstruction. A sampling module 112 of a sensing end 110 generates a compressed signal $\Psi$ by using a compressive sensing technology after sampling an original signal $\Psi$ by using a sampling matrix $\Psi$. Next, the sensing end 110 transmits the compressed signal $\Psi$ to a reconstruction end 120 by means of a wireless transmission technology, so that the reconstruction end 120 recovers the compressed signal $\Psi$ into the original signal $\Psi$ by means of a compressive sensing reconstruction algorithm. During a recovering process, the reconstruction end 120 performs training by means of a dictionary learning method; during a training process, the reconstruction end 120 continuously detects a sparsity to generate a personalized basis $\Psi$ when the sparsity falls into a preset range for signal reconstruction. The dictionary learning method is a technology that seeks sparse representations of a signal; a matrix formed by the dictionary learning method is the personalized basis $\Psi$, and a manner of forming the matrix thereof is described with reference to the accompanying drawings later. In particular, it should be noted that in practical implementation, the sensing end 110 can switch between transmitting the original signal $\Psi$ and transmitting the compressed signal $\Psi$. The sensing end 110 is in a standard mode initially, and outputs the original signal $\Psi$; because a volume of data transmitted by the sensing end 110 is large, transmission power consumption in the mode is high; when the sensing end 110 receives a control signal, namely, when the sensing end 110 is set to be in a compressive sensing mode, at the moment, the sensing end 110 outputs the compressed signal $\Psi$; because a data volume of the compressed signal is low, at the moment, transmission power consumption in the mode is low, thereby achieving an effect of effectively reducing transmission frequency bandwidths and transmission power consumption.

Figure 4:
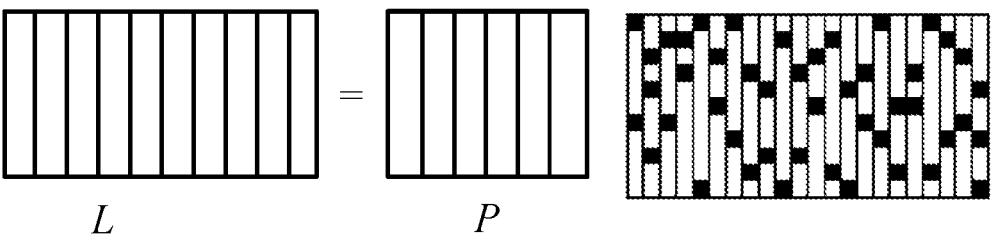
FIG. 4 is a schematic diagram of applying the present invention to generate a personalized basis.

Refer to "FIG. 4". "FIG. 4" is a schematic diagram of applying the present invention to generate a personalized basis. First, make T=[t₁ ... t_L]∈ $\mathbb{R}^{N \times L}$ a set of samples of N-dimensional training ECG signals, and Ψ∈ $\mathbb{R}^{N \times P}$ is an over complete dictionary, which includes P prototype signal atoms, and then the dictionary can be resolved by resolving the following problem:

$$\min_{\Psi, C} \|T - \Psi C\|_F^2 \text{ s.t. } \|c_i\|_0 \le K_{thr} \forall\ i,$$

C∈ $\mathbb{R}^{P \times L}$ is a sparse coefficient matrix of an original signal T; $K_{thr}$ is a preset sparsity constraint; and $\|\cdot\|_F^2$ is a Frobenius norm. In practical implementation, a well-known method of optimal directions (MOD) can be selected as a dictionary learning method to perform solution to obtain a dictionary matrix as a personalized basis Ψ. For example, in a training process, a sparsity (namely: the number of dark dots in a sparse coefficient matrix) is continuously detected so that a personalized basis Ψ is generated when the sparsity falls into a preset range (such as: a value 3); if the sparsity cannot fall into the preset range, a corresponding processing manner thereof is: when a certain number of times of iteration is reached, if the sparsity still fails to reach a target sparsity, the sparsity cannot fall into the preset range, and the target sparsity is relaxed to perform training again.

Figure 5:
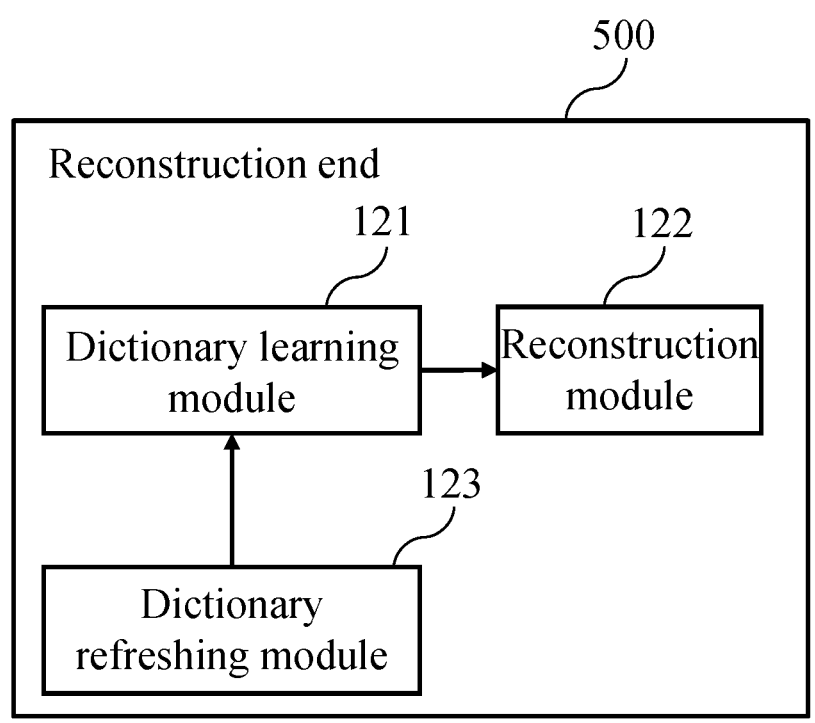
FIG. 5 is a schematic diagram of applying the present invention to refresh a personalized basis.

As shown in "FIG. 5", "FIG. 5" is a schematic diagram of applying the present invention to refresh a personalized basis. It is previously mentioned that if a sparsifying basis as a personalized basis is not good after selection, a signal recovering effect is poor. Therefore, a reconstruction end 500 may further include a dictionary refreshing module 123 for detecting a compressive sensing sparsity; when the sparsity is greater than a preset value (for example, a value 3), a switch signal is transmitted to a sensing end 110 to make the sensing end 110 transmit an original signal to a reconstruction end 120; the dictionary refreshing module 123 regenerates a substitute basis by means of a dictionary learning method according to the received original signal to replace the original personalized basis. Using the sparse coefficient C shown in "FIG. 4" as an example, the number (namely: the sparsity) of dark blocks of each column is less than a value 3, and it indicates that sparsity of the signal is good; when the number of dark blocks of one or more columns is greater than the value 3, it represents that the sparsity of a solution on the basis is apparently increased (the sparsity starts to get worse); therefore, the dictionary refreshing module 123 starts a dictionary refreshing mechanism to transmit a switch signal to a sensing end 110 and requires the sensing end 110 to transmit the original signals (namely: uncompressed physiological signals); and then the dictionary refreshing module 123 receives the original signals so as to regenerate a substitute basis by means of the dictionary learning method according to the received original signals to replace the original personalized basis, and complete actions of dictionary refreshing (also called a personalized basis), which can be considered as a design for implementing self correction and refreshing. A compression ratio of a signal can be effectively improved by means of the refreshing mechanism.

Figure 6:
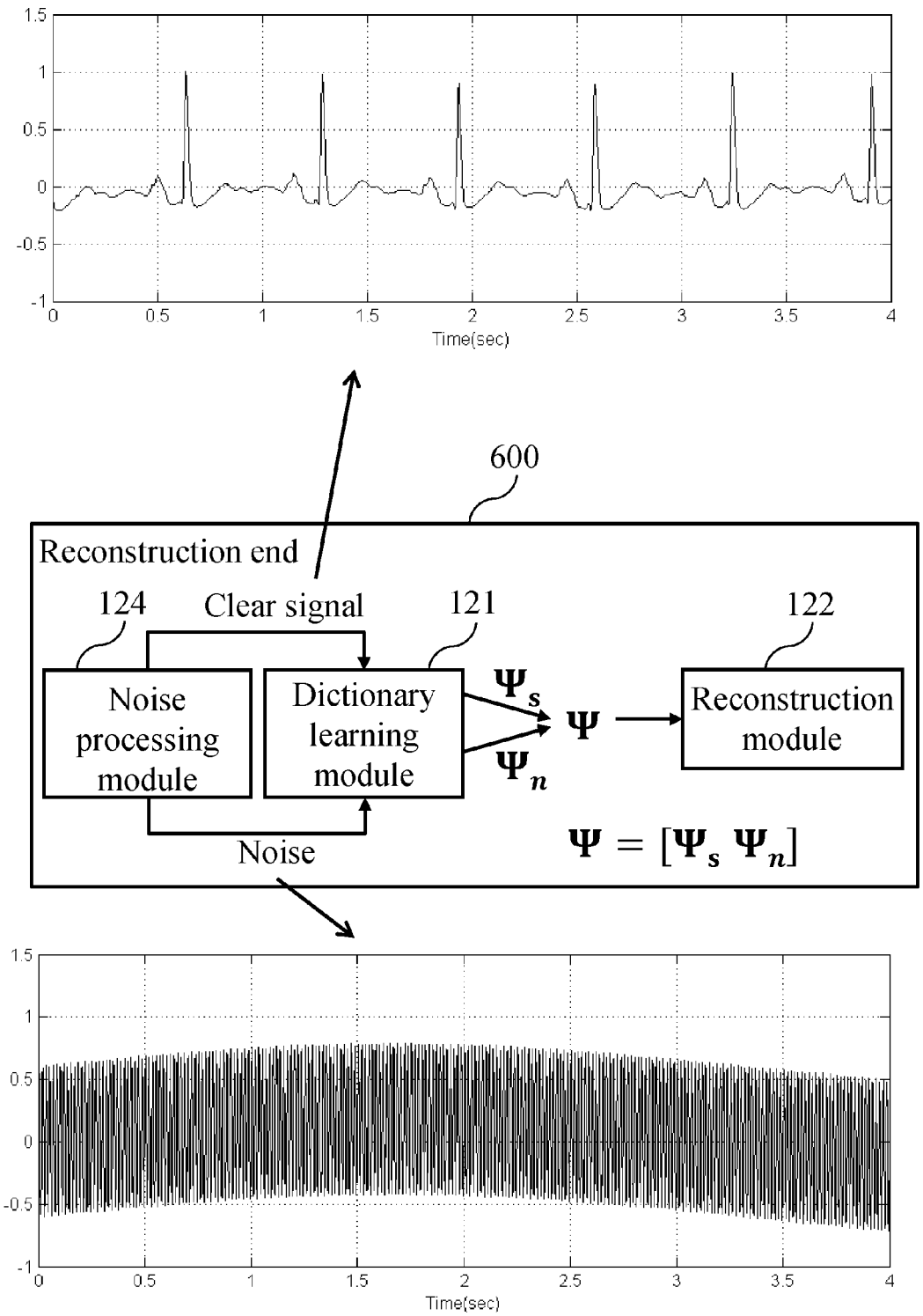
FIG. 6 is a schematic diagram of applying the present invention to perform denoising.

Refer to "FIG. 6". "FIG. 6" is a schematic diagram of applying the present invention to perform denoising. In practical implementation, a reconstruction end 600 includes a noise processing module 124, configured to perform denoising on an original signal according to a denoising algorithm to generate a clear signal and a noise signal; next, a dictionary learning module 121 generates a corresponding signal basis $\Psi_H$ and a corresponding noise basis $\Psi_{\bar{H}}$ according to the clear signal and the noise signal respectively, and combines the clear basis and the noise basis as a personalized basis $\Psi_H$. Specifically, in the first phase, a denoising algorithm is used to classify physiological signals into clear physiological signals (namely: clear signals) and noise signals (Noise), and dictionary learning is separately performed on the two types of signals to obtain bases thereof, which are used as a signal basis $\Psi_H$ and a noise basis $\Psi_{\bar{H}}$ respectively, and then the two bases are combined into a basis for signal reconstruction. In the second phase, some of the solved sparse solutions fall onto the signal basis $\Psi_H$, and some fall onto the noise basis $\Psi_{\bar{H}}$; a reconstruction module 122 only reconstructs the solutions that fall on the signal basis $\Psi_H$. Therefore, a denoising effect can be achieved during compressive sensing signal reconstruction; the manner is a design for implementing denoising.

Figure 7:
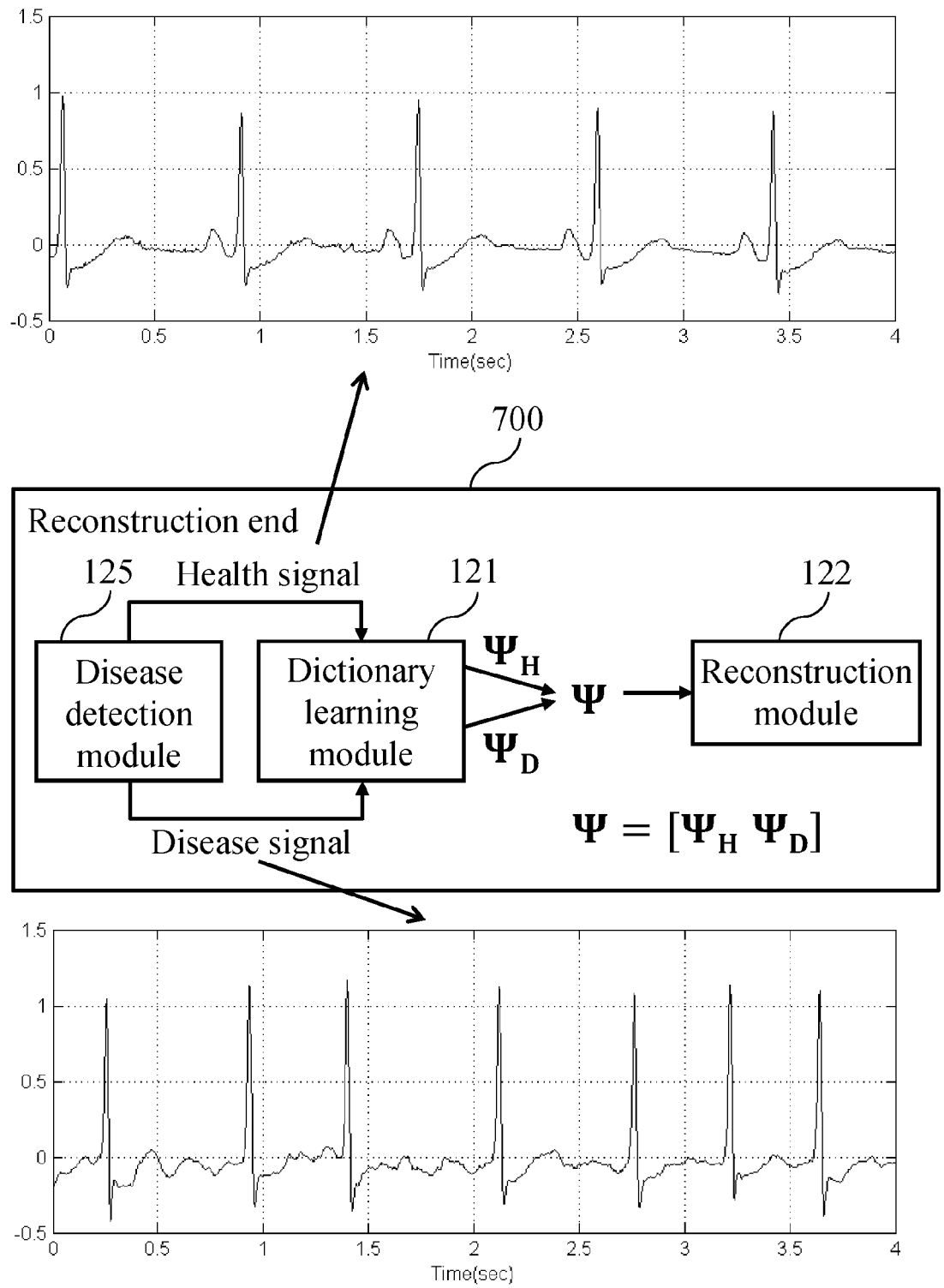
FIG. 7 is a schematic diagram of applying the present invention to detect whether diseases exist in personal physiological signals.

Refer to "FIG. 7". "FIG. 7" is a schematic diagram of applying the present invention to detect whether diseases exist in personal physiological signals. Because some diseases are sporadic, how to continuously detect occurrence of diseases is an important problem. In practical implementation, a reconstruction end 700 may further include a disease detection module 125 for analyzing an original signal to generate a health signal and a disease signal, and a dictionary learning module 121 generates the health signal and the disease signal into a health basis $\Psi_H$ and a disease basis $\Psi_{\bar{H}}$ respectively by means of a dictionary learning method, and combines $\Psi_H$ and the disease basis $\Psi_{\bar{H}}$ as a personalized basis $\Psi_H$ Specifically, in the first phase, a disease detection algorithm is used to classify physiological signals into health physiological signals (the health signals) and disease signals, and dictionary learning is separately performed on the two types of signals to solve bases thereof, which are used as a health basis $\Psi_H$ and a disease basis $\Psi_{\bar{H}}$ respectively, and then the two bases are combined into a basis for reconstruction. In the second phase, some of the solved sparse solutions fall onto the health basis, and some fall onto the disease basis; when power of the solutions on the disease basis is greater than a preset threshold or greater than power of the solutions on the health basis, signals in the period are detected as signals with diseases; therefore, a reconstruction module 122 can achieve an effect of disease detection when performing compressive sensing signal reconstruction, for example: Atrial Fibrillation detection (AF detection). In other words, the manner is a design for implementing symptom detection.

As shown in "FIG. 8", "FIG. 8" is a schematic diagram of comparing a compression ratio of applying a personalized basis of the present invention to reconstruct a signal and a compression ratio of applying a conventional DWT basis to reconstruct a signal. A vertical axis is a percentage root-mean-square difference (PRD), and the smaller the value is, the better; a horizontal axis is a compression ratio, and the greater the value is, the higher the compression ratio is. It can be clearly seen in FIG. 8 that, under a condition of a same PRD, a compression ratio of using a personalized basis may be 2.11 times a compression ratio of using a conventional DWT basis. In other words, applying the personalized basis of the present invention can increase a compression ratio from 35% to about 75% under a precondition of not affecting a PRD, thereby effectively improving a signal compression ratio.

Based on above, it can be known that the present invention differs from the prior art in sensing, by a sensing end, an original signal, and transmitting the original signal to a reconstruction end; generating, by the reconstruction end, a personalized basis by means of a dictionary learning method; next, making the sensing end sample the original signal according to a sampling matrix to generate a compressed signal and transmit the compressed signal to the reconstruction end so that the reconstruction end executes a compressive sensing reconstruction algorithm according to the personalized basis and the compressed signal, and recovers the compressed signal into the original signal. By means of the technical means, the problem existing the prior art can be resolved, thereby achieving an effect of improving signal recovering quality and a signal compression ratio.

What is claimed is:

1. A compressive sensing system based on a personalized basis, comprising:
    a sensing end, wherein the sensing end comprises:
        a sensing module, configured to continuously sense an original signal by means of at least one sensor;
        a sampling module, configured to sample the sensed original signal according to a preset sampling matrix to generate a compressed signal; and
        a transmission module, configured to transmit the sensed original signal, and after receiving a control signal, enable the sampling module to transmit the generated compressed signal; and
    a reconstruction end, wherein the reconstruction end comprises:
        a dictionary learning module, configured to receive the original signal from the sensing end, and perform training by means of a dictionary learning method according to the original signal; during a training process, continuously detect a sparsity to generate a personalized basis when the sparsity falls into a preset range, and after the personalized basis is generated, transmit the control signal to the sensing end; and
        a reconstruction module, configured to execute, after the personalized basis is generated, a compressive sensing reconstruction algorithm according to the personalized basis and the compressed signal received from the sensing end to recover the compressed signal into the original signal.

2. The compressive sensing system based on a personalized basis according to claim 1, wherein the reconstruction end further comprises a dictionary refreshing module, configured to detect the compressive sensing sparsity; when the sparsity is greater than a preset value, a switch signal is transmitted to the sensing end so that the sensing end transmits the original signal to the reconstruction end; the dictionary refreshing module generates a substitute basis by means of the dictionary learning method according to the received original signal to replace the personalized basis.

3. The compressive sensing system based on a personalized basis according to claim 1, wherein the reconstruction end further comprises a noise processing module, configured to perform denoising on the original signal according to a denoising algorithm to generate a clear signal and a noise signal; the dictionary learning module generates a signal basis and a noise basis according to the clear signal and the noise signal respectively, and combines the clear basis and the noise basis into the personalized basis.

4. The compressive sensing system based on a personalized basis according to claim 1, wherein the reconstruction end further comprises a disease detection module, configured to analyze the original signal to generate a health signal and a disease signal, and generates a health basis and a disease basis according to the health signal and the disease signal respectively by means of the dictionary learning method, and combines the health basis and the disease basis into the personalized basis.

5. The compressive sensing system based on a personalized basis according to claim 1, wherein the sampling matrix is at least one of a random Gaussian matrix, a random Bernoulli matrix, a some orthogonal matrix, a Toeplitz matrix, a circulant matrix, and a random sparse matrix.

6. A compressive sensing method based on a personalized basis, which is applied in an environment having a sensing end and a reconstruction end, comprising:
    continuously sensing, by the sensing end, an original signal by means of at least one sensor;
    transmitting, by the sensing end, the sensed original signal to the reconstruction end;
    performing, by the reconstruction end, training by means of a dictionary learning method according to the original signal, during a training process, continuously detecting a sparsity to generate a personalized basis when the sparsity falls into a preset range, and after the personalized basis is generated, transmitting a control signal to the sensing end;
    after receiving the control signal, sampling, by the sensing end, the original signal according to a preset sampling matrix to generate a compressed signal, and transmitting the compressed signal to the reconstruction end; and
    executing, by the reconstruction end, a compressive sensing reconstruction algorithm according to the personalized basis and the compressed signal received from the sensing end to recover the compressed signal into the original signal.

7. The compressive sensing method based on a personalized basis according to claim 6, wherein the method further comprises detecting the compressive sensing sparsity, when the sparsity is greater than a preset value, transmitting a switch signal to the sensing end so that the sensing end transmits the original signal to the reconstruction end, and generating, by the reconstruction end, a substitute basis by means of the dictionary learning method according to the received original signal to replace the personalized basis.

8. The compressive sensing method based on a personalized basis according to claim 6, wherein the step of generating, by the reconstruction end, the personalized basis by means of the dictionary learning method according to the original signal comprises performing denoising on the original signal according to a denoising algorithm to generate a clear signal and a noise signal, generating a corresponding signal basis and a corresponding noise basis according to the clear signal and the noise signal respectively, and combining the clear basis and the noise basis into the personalized basis.

9. The compressive sensing method based on a personalized basis according to claim 6, wherein the step of generating, by the reconstruction end, the personalized basis by means of the dictionary learning method according to the original signal comprises analyzing the original signal to generate a health signal and a disease signal, generating a health basis and a disease basis according to the health signal and the disease signal respectively by means of the dictionary learning method, and combining the health basis and the disease basis into the personalized basis.

10. The compressive sensing method based on a personalized basis according to claim 6, wherein the sampling matrix is at least one of a random Gaussian matrix, a random Bernoulli matrix, a some orthogonal matrix, a Toeplitz matrix, a circulant matrix, and a random sparse matrix.

* * * * *